United States Patent [19]

Hsieh

[11] 3,884,889

[45] May 20, 1975

[54] CYCLIC TRIENE COUPLING AGENTS
[75] Inventor: Henry L. Hsieh, Bartlesville, Okla.
[73] Assignee: Phillips Petroleum Company, Bartlesville, Okla.
[22] Filed: June 1, 1973
[21] Appl. No.: 366,244

[52] U.S. Cl. ............ 260/83.7; 260/82.1; 260/93.5; 260/94.2 M
[51] Int. Cl. .......................... C08d 1/20; C08d 1/36
[58] Field of Search .............................. 260/94.2 M

[56] References Cited
UNITED STATES PATENTS

| 3,324,092 | 6/1967 | Naarmann et al......... 260/94.2 M X |
| 3,331,826 | 7/1967 | Talcott.......................... 260/94.2 M |
| 3,706,721 | 12/1972 | Grinninger................. 260/94.2 T X |

Primary Examiner—William F. Hamrock

[57] ABSTRACT

Cyclic trienes are utilized as coupling agents for polymers which are prepared employing an organolithium initiator.

6 Claims, No Drawings

CYCLIC TRIENE COUPLING AGENTS

This invention relates to the coupling of polymers which have been prepared employing an organolithium initiator.

Many polymers of conjugated dienes prepared in the presence of an organolithium initiator have a strong tendency to flow in the uncured state. It is possible, of course, to crosslink the molecules of these polymers such as is done by conventional curing in order to reduce cold flow. However, this approach is undesirable for polymers that must be later compounded in masticating equipment. The formation of relatively high amounts of gel, as a result of crosslinking, greatly reduces the ease with which the polymers can be mixed with other materials and fabricated. It is, thus, highly desirable to find a method of reducing the tendency of these conjugated diene polymers to cold flow without formation of gel. Coupling in accordance with this invention provides such a method and does so by employing a novel coupling agent. In addition to a reduction in cold flow, an increase in Mooney viscosity results and, as evidenced by an increase in the heterogeneity index, an improvement in processability also results. These results have substantial practical value.

Agents which have been added to polymers prepared employing organolithium initiators in order to reduce cold flow include materials such as polyepoxides, polyisocyanates, polyimines, polyaldehydes, polyketones, polyanhydrides, polyesters, and polyhalides that possess at least three reactive sites, as disclosed in U.S. Pat. No. 3,281,383. U.S. Pat. No. 3,280,084 discloses the use of polyvinyl aromatic compounds for the reduction of cold flow in such polymers.

Accordingly, an object of this invention is to provide a new coupling agent for polymers which have been prepared employing an organolithium initiator.

It is a further object of this invention to provide a coupling agent which reduces the tendency of polymers to cold flow without formation of gel.

It is another object of this invention to provide a method for increasing the Mooney viscosity of such polymers.

It is yet another object of this invention to provide a process for improving the processability of such polymers as evidenced by an increase in the heterogeneity index.

Other objects, aspects and the several advantages of the invention will be apparent to those skilled in the art upon reading the specification and the appended claims.

In accordance with this invention, it has been found that polymers which are prepared employing an organolithium initiator can be effectively coupled in the presence of cyclic trienes.

It has further been found that polymers coupled with cyclic trienes contain long-chain branching which improves processing and reduces cold flow without gel formation and increases Mooney viscosity.

The polymers which are useful herein are prepared from hydrocarbon monomers such as conjugated dienes or vinyl aromatic compounds or combinations thereof. Such polymers are prepared in the presence of an organolithium initiator as disclosed, for example, in U.S. Pat. Nos. 2,975,160 and 3,030,346.

Monomers which can be used to prepare the polymers of this invention should be hydrocarbons such as the conjugated dienes or the vinyl aromatic compounds or combinations thereof. The conjugated dienes ordinarily contain from 4 to 12 carbon atoms per molecule and those containing from 4 to 8 carbon atoms are preferred. Examples of such compounds include 1,3-butadiene, isoprene, 2,3-dimethyl-1,3-butadiene, piperylene, 3-butyl-1,3-octadiene, phenyl-1,3-butadiene, and the like. The vinyl aromatic compounds include styrene, 1-vinylnaphthalene, 2-vinylnaphthalene, and the alkyl, cycloalkyl, aryl, alkaryl, and aralkyl derivatives thereof in which the total number of carbon atoms in the combined substituents is generally not greater than 12. Examples of such substituted monomers include 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, and the like.

The conjugated dienes and the vinyl aromatic compounds can be polymerized alone or in admixture to form homopolymers, copolymers including random and block copolymers. Monomers which are preferred for the practice of this invention are butadiene and styrene. The preferred polymers are those in which the conjugated dienes are present in a major amount.

The polymers are prepared by contacting the monomer or monomers with an organolithium initiator. Suitable organolithium initiators can be represented by the formula $RLi_x$ where R is a hydrocarbon radical selected from the group consisting of aliphatic, cycloaliphatic and aromatic radicals containing from 1 to 20 carbon atoms and x is an integer of 1 to 4. Examples of such initiators include methyllithium, n-butyllithium, sec-butyllithium, cyclohexyllithium, 1,4-dilithiobutane, 1,4-dilithio-2-methyl-2-butene, dilithionaphthalene, 1,2-dilithio-1,2-diphenylethane, tetralithionaphthalene, and the like. The organo monolithium compounds are preferred, e.g., n-butyllithium.

Polymerizations of this type are well known and are normally carried out in the presence of a diluent which is predominantly hydrocarbon such as cyclohexane, methylcyclohexane, benzene, toluene, n-hexane, isooctane, or the like. The amount of initiator used depends upon the desired molecular weight of the polymer but is normally in the range of about 0.1 to 100 millimoles per 100 grams of monomer.

The cyclic trienes which are useful in this invention are 1,3,5-conjugated cycloheptatrienes having the formula

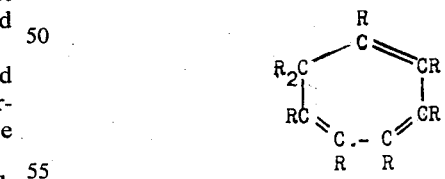

wherein R is hydrogen or alkyl such that the total number of carbon atoms in the molecule will not exceed about 16. Examples of such include 1,3,5-cycloheptatriene, 7-ethyl-1,3,5-cycloheptatriene, 7,7-dimethyl-1,3,5-cycloheptatriene, 2-methyl-7-isopropyl-1,3,5-cycloheptatriene, and 3,7,7-tri(n-propyl)-1,3,5-cycloheptatriene. The preferred compound for use as a coupling agent in the instant invention is 1,3,5-cycloheptatriene.

In accordance with this invention, only a very small amount of cyclic triene compound is required. It is desirable to use not more than 10 parts by weight per 100 parts of monomer. For best results in obtaining reduced cold flow without production of gel in the polymer, it is preferred to use about 0.1 to 10 parts by weight of cyclic triene compounds per 100 parts of monomer. The actual amount used depends upon the initiator level, monomer or combination of monomers employed, and the degree of coupling desired.

In accordance with the invention, the coupling agent is applied prior to shortstopping. The coupling agent can be added before or during the polymerization, in which case a random coupling process occurs and an irregular-shaped polymer molecule results. Alternatively, the coupling agent can be added upon completion of polymerization, in which case terminal coupling occurs and the coupled product can be essentially a star-shaped polymer.

While the polymerization temperature can vary over a very broad range, for example, from 0° to +300°F, the temperature requirements for the reaction of the cyclic trienes are more limited. The time and temperature of the reaction are dependent in that at higher temperatures the reaction is carried out in shorter time. Ordinarily the reaction temperature is in the range of about 85° to 300°F although temperatures somewhat above or below this range can be used for a portion of the overall reaction. Preferably the temperature is in the range of about 120° to 250°F and temperatures in the range of about 150° to 250°F produce satisfactory results in a short time. A satisfactory procedure is to carry out the polymerization reaction within the 85° to 300°F temperature range and to use the same temperature for the reaction of the cyclic triene compound whether added before, at the beginning or after the polymerization.

The period required for the polymerization and for the reaction of the cyclic triene compound can range anywhere from about 2 minutes to 100 hours or more although the time is ordinarily in the range of about 5 minutes to 10 hours for each step. These reaction periods vary to some degree depending upon the amount of cyclic triene compound charged with the greater amounts reducing the time for the reaction.

Various substances are known to be detrimental to the process of this invention. These materials include carbon dioxide, oxygen and water. Usually it is desirable, therefore, that the reactants and diluent be freed of these materials as well as any other material which may tend to inactivate the initiator or interfere with the polymerization or with the coupling reaction. Furthermore, it is desirable to remove air and moisture from the reactor in which the polymerization and coupling is to be conducted. Upon completion of the polymerization and coupling, the reaction mixture is then treated to inactivate the initiator and to remove the rubbery polymer. A suitable method for accomplishing this involves steam stripping the diluent from the polymer. In another suitable method, an initiator inactivating material, such as an alcohol, is added to the mixture so as to inactivate the catalyst and cause precipitation of the polymer. The polymer is then separated from the alcohol and diluent by any suitable means, such as decantation or filtration. It has been found advantageous to add an anti-oxidant, such as 2,6-di-t-butyl-4-methylphenol, to the polymer solution prior to recovery of the polymer.

The rubbery polymers of this invention can be compounded by conventional means. Compounding ingredients, such as fillers, dyes, pigments and the like, can be employed. These rubbery polymers can be employed in the manufacture of items such as automobile tires, gaskets, containers, pipes, and the like.

SPECIFIC EXAMPLES

The runs illustrative of this invention were carried out under the following general conditions.

The polymerizations were carried out under nitrogen in capped beverage bottles employing anhydrous reactants and conditions. The bottles were tumbled in a constant temperature bath for the polymerization times and at the temperatures stated below.

Following polymerization, 2,6-di-t-butyl-4-methylphenol (1 part per hundred parts of monomer) was added in a 50/50 volume toluene/isopropyl alcohol solution, the polymer solutions were filtered, and the polymers were coagulated by adding the filtrates to isopropyl alcohol. The polymers were then collected by filtration and dried at 50°C at reduced pressure. The polymers thus produced were rubbery in character.

In the tables below the following abbreviations are employed: CHTE (cycloheptatriene), THF (tetrahydrofuran), and phm (parts by weight per hundred parts of monomer).

In the runs, inherent viscosity was determined in tetrahydrofuran and gel content was also determined with both determinations made in accordance with the procedures described in U.S. Pat. No. 3,278,508.

$M_n$ (number average molecular weight) and $M_w$ (weight average molecular weight) were determined by gel permeation chromatography in accordance with the method of G. Kraus and C. J. Stacy, J. Poly. Sci. A-2 10, 657 (1972).

The heterogeneity index is the quotient obtained by dividing the weight average molecular weight by the number average molecular weight.

Mooney viscosities as ML-4 at 212°F were determined in accordance with ASTM D 1646-63.

Cold flow was measured by extruding the rubber through a quarter-inch orifice at 3.5 psi pressure and at a temperature of 50°C. After allowing 10 minutes for the rubber to reach steady state, the rate of extrusion was measured and reported in milligrams per minute.

Random coupling is illustrated in Examples I, II and III, and terminal coupling is illustrated in Example IV.

EXAMPLE I

Cycloheptatriene as Branching Agent at 122°F

In accordance with the general description above, the following materials were sequentially charged to the reactor: cyclohexane (780 parts), tetrahydrofuran (THF) (variable amounts), 1,3,5-cycloheptatriene (CHTE) (variable amounts), butadiene (100 parts), and sec-butyllithium (1.4 mmoles). The polymerization temperature was maintained at 122°F.

| Run No. | CHTE, phm | THF, phm | Conversion, Weight % | ML-4, 212°F | Cold Flow, mg/min. | Inherent Viscosity[a] | Heterogeneity Index | $M_w \times 10^{-3}$ | $M_n \times 10^{-3}$ |
|---|---|---|---|---|---|---|---|---|---|
| | | | Polymerization Time = 20 Hours | | | | | | |
| I-a | 0 | 0 | 100 | 7 | b | 1.47 | 1.21 | 119 | 98 |
| I-b | 1 | 0 | 100 | 32 | 2.65 | 1.88 | 1.59 | 221 | 139 |
| I-c | 3 | 0 | 100 | 60 | 0 | 2.07 | 1.97 | 332 | 168 |
| I-d | 5 | 0 | 100 | 87 | 0 | 2.25 | 3.0 | 426 | 143 |
| I-e | 0 | 2 | 100 | 9 | b | 1.39 | 1.31 | 132 | 101 |
| I-f | 1 | 2 | 100 | 27 | 4.09 | 1.72 | 1.74 | 205 | 118 |
| I-g | 3 | 2 | 96 | 38 | 1.14 | 1.81 | 1.97 | 258 | 131 |
| I-h | 5 | 2 | 83 | 35 | 1.21 | 1.73 | 2.1 | 258 | 123 |
| | | | Polymerization Time = 4 Hours | | | | | | |
| I-i | 0 | 0 | 100 | 6 | b | 1.41 | 1.17 | 106 | 91 |
| I-j | 1 | 0 | 100 | 11 | b | 1.51 | 1.23 | 129 | 105 |
| T-k | 3 | 0 | 100 | 26 | 9.49 | 1.65 | 1.39 | 153 | 110 |
| I-l | 5 | 0 | 100 | 40 | 1.83 | 1.74 | 1.65 | 197 | 119 |
| I-m | 0 | 2 | 100 | 8 | b | 1.40 | 1.18 | 119 | 101 |
| I-n | 1 | 2 | 92 | 15 | 13.5 | 1.49 | 1.49 | 147 | 99 |

[a] - Gel-free.
b - Exceeds limit of test (>100).

Runs I-b, -c, -d, -f, -g, -h, -j, -k, -l, and -n illustrate the improved properties of polybutadiene prepared using the 1,3,5-cycloheptatriene coupling agent, i.e., increased Mooney values; reduced cold flow; increased inherent viscosity; increased molecular weight values; and increased heterogeneity index values.

EXAMPLE II

Cycloheptatriene as Branching Agent at 158° F

In this example the following materials were sequentially charged to the reactor: cyclohexane (780 parts), CHTE (variable amounts), butadiene (100 parts), and n-butyllithium (1.14 mmoles). The polymerization temperature was maintained at 158° F.

This example shows that the addition of CHTE increases Mooney values, inherent viscosity, heterogeneity index, and molecular weight values indicating that coupling has occurred.

EXAMPLE III

Cycloheptatriene as Random Branching Agent in Butadiene-Styrene Copolymerization The following materials were sequentially charged to the reactor: cyclohexane (780 parts), styrene (40 parts), CHTE (variable amounts) butadiene (100 parts), and n-butyllithium (2.0 mmoles). The temperature was maintained at 158° F for 3 hours.

| Run No. | CHTE, phm | Conversion, Wt. % | ML-4, 212° F | Inherent Viscosity[a] | Heterogeneity Index | $M_w \times 10^{-3}$ | $M_n \times 10^{-3}$ |
|---|---|---|---|---|---|---|---|
| | | Polymerization Time = 3 Hours | | | | | |
| II-a | 0 | 100 | b | 1.31 | 1.11 | 94 | 84 |
| II-b | 1 | 100 | 22 | 1.71 | 1.48 | 327 | 221 |
| II-c | 3 | 100 | 65 | 2.21 | 2.1 | 342 | 163 |
| II-d | 5 | 100 | 90 | 2.27 | 2.9 | 553 | 191 |
| | | Polymerization Time = 1 Hour | | | | | |
| II-e | 0 | 100 | b | 1.37 | 1.12 | 102 | 92 |
| II-f | 1 | 100 | 16 | 1.57 | 1.28 | 144 | 113 |
| II-g | 3 | 100 | 41 | 1.79 | 1.65 | 216 | 131 |
| II-h | 5 | 100 | 49 | 1.84 | 2.1 | 253 | 122 |

[a] - Gel-free.
b - Too soft to measure.

| Run No. | CHTE, phm | Conversion, Wt.% | Inherent Viscosity | Gel % | Heterogeneity Index | $M_w \times 10^{-3}$ | $M_n \times 10^{-3}$ |
|---|---|---|---|---|---|---|---|
| III-a | 0.12 | 100 | 0.92 | 0 | 1.43 | 113 | 80 |
| III-b | 0.25 | 100 | 1.07 | 0 | 1.72 | 170 | 99 |
| III-c | 0.5 | 100 | 1.31 | 0 | 2.8 | 406 | 147 |
| III-d | 1.0 | 100 | 1.54 | 66 | — | — | — |

Effective random branching is seen, through the values for inherent viscosity, for molecular weight, and heterogeneity index, when cycloheptatriene is employed in a butadiene-styrene copolymer system.

EXAMPLE IV

Cycloheptatriene as a Terminal Coupling Agent

In this example the following materials were sequentially charged to the reactor: cyclohexane (780 parts), THF (variable amounts), butadiene (100 parts), and sec-butyllithium (1.4 mmoles). The reaction was carried out at 122° F for 3 hours. After the polymerization reaction was complete, CHTE was added in variable amounts and the reaction was carried out at various time-temperature combinations.

| Run No. | CHTE, phm | THF, phm | Inherent Viscosity[a] | Heterogeneity Index | $M_w \times 10^{-3}$ | $M_n \times 10^{-3}$ |
|---|---|---|---|---|---|---|
| | | | Termination Reaction = 122°F for 3 hours. | | | |
| IV-a | 0 | 0 | 1.46 | 1.17 | 114 | 98 |
| IV-b | 3 | 0 | 1.58 | 1.23 | 133 | 108 |
| IV-c | 5 | 0 | 1.49 | 1.22 | 125 | 103 |
| IV-d | 0 | 5 | 1.38 | 1.19 | 116 | 97 |
| IV-e | 1 | 5 | 1.33 | 1.18 | 109 | 93 |
| IV-f | 3 | 5 | 1.38 | 1.21 | 118 | 98 |
| IV-g | 5 | 5 | 1.44 | 1.21 | 125 | 103 |
| | | | Termination Reaction = 158°F for 4 hours. | | | |
| IV-h | 0 | 0 | 1.49[b] | 1.15 | 111 | 97 |
| IV-i | 1 | 0 | 1.70[c] | 1.35 | 161 | 119 |
| IV-j | 3 | 0 | 1.63 | 1.32 | 148 | 112 |
| IV-k | 5 | 0 | 1.53 | 1.29 | 139 | 108 |
| IV-l | 0 | 5 | 1.39 | 1.21 | 120 | 99 |
| IV-m | 1 | 5 | 1.38 | 1.18 | 112 | 95 |
| IV-n | 3 | 5 | 1.43 | 1.25 | 125 | 100 |
| IV-o | 5 | 5 | 1.33 | 1.18 | 113 | 95 |

[a]Quantitative conversion and gel-free.
[b]ML-4 = 8.
[c]ML-4 = 23.

This series of runs indicates that 1,3,5-cycloheptatriene can be utilized as a terminal coupling agent. However, terminal branching with cycloheptatriene as the branching agent is less effective than random branching.

The above examples clearly demonstrate the effectiveness of 1,3,5-cycloheptatriene as a coupling agent for polymers of conjugated dienes and/or vinyl aromatic compounds.

As will be evident to those skilled in the art, there are variations and modifications of this invention which can be practiced in view of the foregoing disclosure without departing from the spirit and scope of the invention.

I claim:

1. In a process for the production of rubbery conjugated diene polymers having a tendency to cold flow by polymerizing a conjugated diene having from 4 to 12 carbon atoms per molecule in the presence of a hydrocarbon lithium initiator, the improvement for increasing the Mooney viscosity, inherent viscosity, molecular weight values, processability, as well as reducing cold flow of such polymers which improvement comprises carrying out said polymerizing in the presence of a 1,3,5-cycloheptatriene coupling agent having the formula

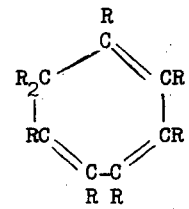

wherein R is hydrogen or alkyl such that the total number of carbon atoms in the molecule will not exceed about 16 in an amount sufficient to reduce the cold flow without gel formation of the resulting polymer, as well as improving said other physical properties of the polymer.

2. A process according to claim 1 wherein said coupling agent is utilized in an amount ranging from about 0.1 to about 10 parts by weight per hundred parts of monomer.

3. A process according to claim 1 wherein said conjugated diene is butadiene and said coupling agent is 1,3,5-cycloheptatriene.

4. A process according to claim 1 wherein said conjugated diene polymer is a copolymer of butadiene and styrene and said coupling agent is 1,3,5-cycloheptatriene.

5. A process according to claim 1 for reducing the tendency of polybutadiene to cold flow which comprises polymerizing butadiene in the presence of butyllithium and 1,3,5-cycloheptatriene.

6. A process according to claim 1 for reducing the tendency of a butadiene-styrene copolymer to cold flow which comprises polymerizing butadiene and styrene in the presence of butyllithium and 1,3,5-cycloheptatriene.

* * * * *